United States Patent
Hamilton, II et al.

(10) Patent No.: US 8,171,559 B2
(45) Date of Patent: May 1, 2012

(54) DETECTING A PHISHING ENTITY IN A VIRTUAL UNIVERSE

(75) Inventors: Rick A. Hamilton, II, Charlottesville, VA (US); Brian M. O'Connell, Cary, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 967 days.

(21) Appl. No.: 12/047,763

(22) Filed: Mar. 13, 2008

(65) Prior Publication Data

US 2009/0235360 A1  Sep. 17, 2009

(51) Int. Cl.
G06F 7/04 (2006.01)

(52) U.S. Cl. .......................................... 726/26

(58) Field of Classification Search .................... None
See application file for complete search history.

(56) References Cited

U.S. PATENT DOCUMENTS 7,250,944 B2 * 7/2007 Anderson et al. ............. 345/419
2007/0244831 A1 * 10/2007 Kuo ................................ 705/67

* cited by examiner

*Primary Examiner* — Brandon Hoffman
(74) *Attorney, Agent, or Firm* — William E. Schiesser; Hoffman Warnick LLC

(57) ABSTRACT

An invention for detecting a phishing virtual entity in a virtual universe is disclosed. A virtual entity may be registered as authentic and be identified with multiple physical characteristics thereof. Another virtual entity will be monitored to detect whether it includes a physical characteristic that is sufficiently similar to that of a registered virtual entity to cause confusion. A phishing virtual entity is detected based on the monitoring and phishing prevention processes may be implemented on the phishing virtual entity.

25 Claims, 4 Drawing Sheets

DETECTING A PHISHING ENTITY IN A VIRTUAL UNIVERSE

TECHNICAL FIELD OF THE INVENTION

This invention relates generally to virtual universes, and more specifically to detecting a fraudulent phishing entity in a virtual universe.

BACKGROUND OF THE INVENTION

Virtual universes or virtual worlds are computer-based simulated environments intended for its users to inhabit and interact via avatars, which are graphical representations that others can see. An avatar often takes the form of a cartoon-like human character. An agent is a user's account with a virtual universe, upon which the user can build an avatar. The agent is tied to the inventory of assets the user owns. These types of virtual universes are now common in massive multiplayer online games, such as Second Life (Second Life is a trademark of Linden Research in the United States, other countries, or both). Avatars in the virtual universes can do a wide range of business and/or social activities. Virtual universes may include other virtual entities such as a virtual store, a virtual club, an article, etc. Each virtual entity including an avatar is assigned with a universally unique identification (UUID) in the virtual universe.

A variety of fraudulent behaviors may be conducted in virtual universes. For example, phishing refers to a form of fraud in which an entity, such as a website or a virtual store, masquerades as another entity by, e.g., copying the other entity's appearance and/or other characteristics. The goal of the fraudulent emulation is to, e.g., lure visitors into providing personal or financial information, which the fraudulent/phishing entity may use for monetary gains.

SUMMARY OF THE INVENTION

In one embodiment, there is a method for detecting a phishing virtual entity in a virtual universe. In this embodiment, the method comprises: identifying a first virtual entity using characteristics of multiple physical aspects of the first virtual entity; detecting an characteristic of at least one of the multiple physical aspects of a second virtual entity; and comparing the characteristic of the second virtual entity with the characteristic of the first virtual entity of a same physical aspect to determine whether one of the first virtual entity or the second virtual entity is a phishing virtual entity.

In a second embodiment, there is a system for detecting a phishing virtual entity in a virtual universe. In this embodiment, the system comprises: means for identifying a first virtual entity using characteristics of multiple physical aspects of the first virtual entity; means for detecting an characteristic of at least one of the multiple physical aspects of a second virtual entity; and means for comparing the characteristic of the second virtual entity with the characteristic of the first virtual entity of a same physical aspect to determine whether one of the first virtual entity or the second virtual entity is a phishing virtual entity.

In a third embodiment, there is a computer program product for detecting a phishing virtual entity in a virtual universe. In this embodiment, the computer program product comprises computer usable program code embodied in a computer readable medium, which when executed by a computer system enables the computer system to: identify a first virtual entity using characteristics of multiple physical aspects of the first virtual entity; detect an characteristic of at least one of the multiple physical aspects of a second virtual entity; and compare the characteristic of the second virtual entity with the characteristic of the first virtual entity of a same physical aspect to determine whether one of the first virtual entity or the second virtual entity is a phishing virtual entity.

In a fourth embodiment, there is a method for providing a system for detecting a phishing virtual entity in a virtual universe. In this embodiment, the method comprises at least one of: creating, maintaining, deploying or supporting a computer infrastructure being operable to: identify a first virtual entity using characteristics of multiple physical aspects of the first virtual entity; detect an characteristic of at least one of the multiple physical aspects of a second virtual entity; and compare the characteristic of the second virtual entity with the characteristic of the first virtual entity of a same physical aspect to determine whether one of the first virtual entity or the second virtual entity is a phishing virtual entity.

Other aspects and features of the present invention, as defined solely by the claims, will become apparent to those ordinarily skilled in the art upon review of the following non-limited detailed description of the invention in conjunction with the accompanying figures.

BRIEF DESCRIPTION OF THE DRAWINGS

It is noted that the drawings of the invention are not to scale. The drawings are intended to depict only typical aspects of the invention, and therefore should not be considered as limiting the scope of the invention. In the drawings, like numbering represents like elements among the drawings.

DETAILED DESCRIPTION OF THE INVENTION

The following detailed description of embodiments refers to the accompanying drawings, which illustrate specific embodiments of the invention. Other embodiments having different structures and operations do not depart from the scope of the present invention.

1. SYSTEM OVERVIEW

Figure 1:
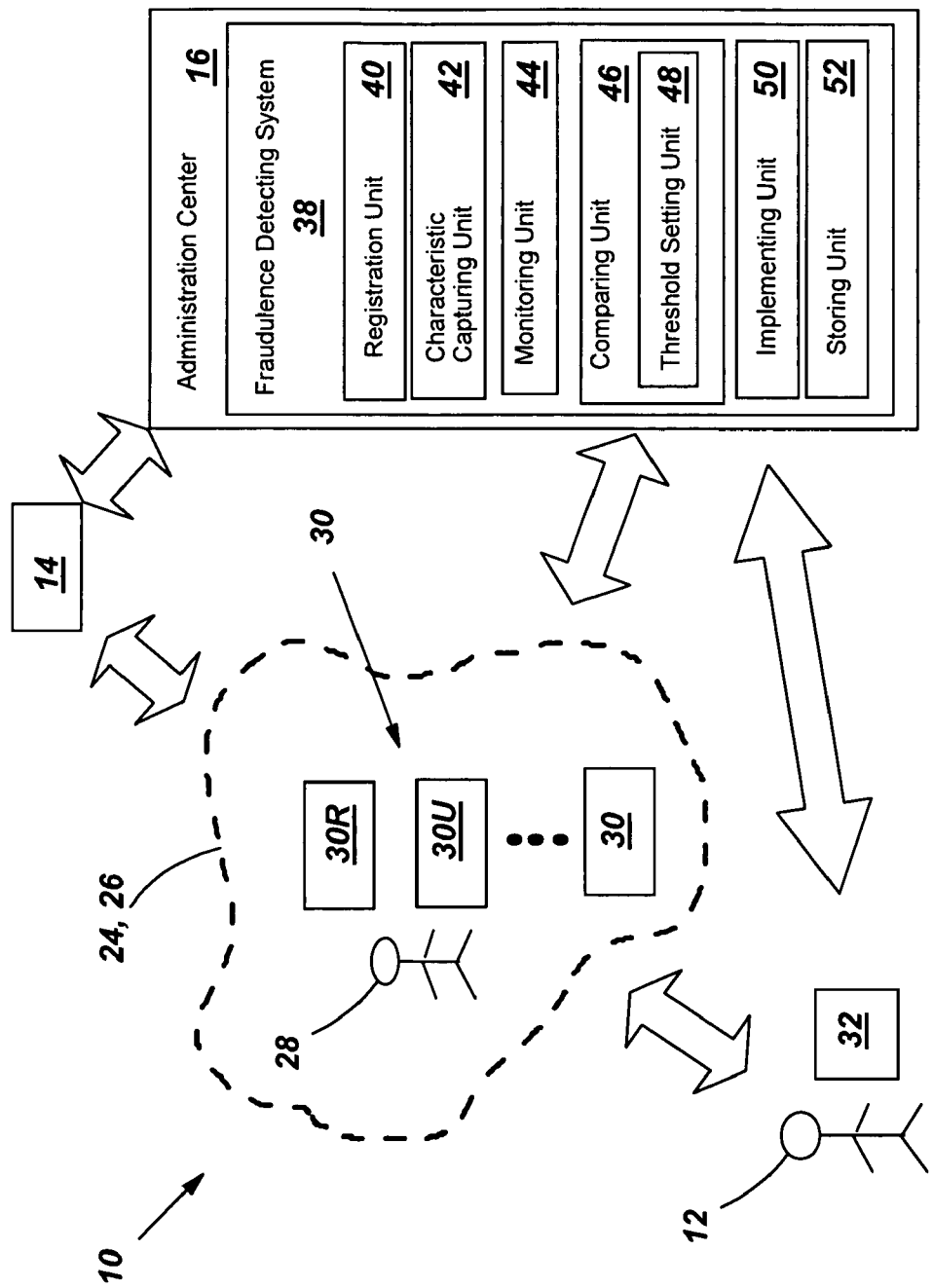
FIG. 1 shows a system according to one embodiment of this invention.

FIG. 1 shows a block diagram of a system 10 according to an embodiment. System 10 includes a virtual world user 12, a virtual world server 14 and an administration center 16. Virtual world server 14 supports a virtual universe 24 including at least one virtual region/island 26 (virtual region 26 shown together with virtual universe 24) where virtual world user 12 may conduct activities via a virtual world representation 28 usually referred to as an avatar 28. Virtual universe 24 may also include various other virtual entities 30, such a virtual store 30. In this description, other virtual entity 30 and avatar 28 may be generally referred to as a virtual entity 28/30, unless specifically indicated otherwise. To this extent, in the current description, a virtual entity 28/30 refers to any virtual representation in virtual universe 24 including, for example, an avatar 28, a virtual place, e.g., a virtual store, within virtual universe 24, an article in virtual universe 24, such as a car of avatar 28, etc. In the description herein, a virtual store is used as an example of other virtual entity 30. A virtual store 30 may be a registered virtual store 30R or an unregistered virtual store 30U (registered virtual store 30R and unregistered virtual store 30U may be generally referred to as virtual store 30). User 12 attends virtual universe 24 through a virtual world client/agent 32, e.g., a virtual world account established through, e.g., a personal computer communicatively coupled to virtual world server 14. Virtual entities 28/30 interact with one another in the virtual activities. As is appreciated, a virtual store 30 may commit phishing activity by fraudulently emulating itself as another virtual store 30 in exterior appearance, interior appearance, slogan, and/or store name, etc. For example, an avatar 28 may confuse a phishing virtual store 30 with another virtual store 30 or a virtual counterpart of a real world store as the two may have similar appearances. The avatar 28 may perform a "transaction" with the phishing virtual store 30 by providing its financial information, e.g., credit card information, to the phishing virtual store 30, which may maliciously use the financial information for its own monetary benefit(s).

Administration center 16 includes a fraudulence detecting system 38. Fraudulence detecting system 38 includes a registration unit 40; an characteristic capturing unit 42; a monitoring unit 44; a comparing unit 46 including a threshold setting unit 48; an implementing unit 50; and a storing unit 52. Other component(s) required for the operation of fraudulence detecting system 38 may also be included as is understood in the art.

According to an embodiment, administration center 16 may be implemented by a computer system. The computer system can comprise any general purpose computing article of manufacture capable of executing computer program code installed thereon to perform the process described herein. The computer system can also comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

As should be appreciated, virtual world server 14 and administration center 16 and components thereof may be positioned at the same physical location or may be at different physical locations. The interaction of system 10 components will be described herein in detail.

2. OPERATION METHODOLOGY

Figure 2:
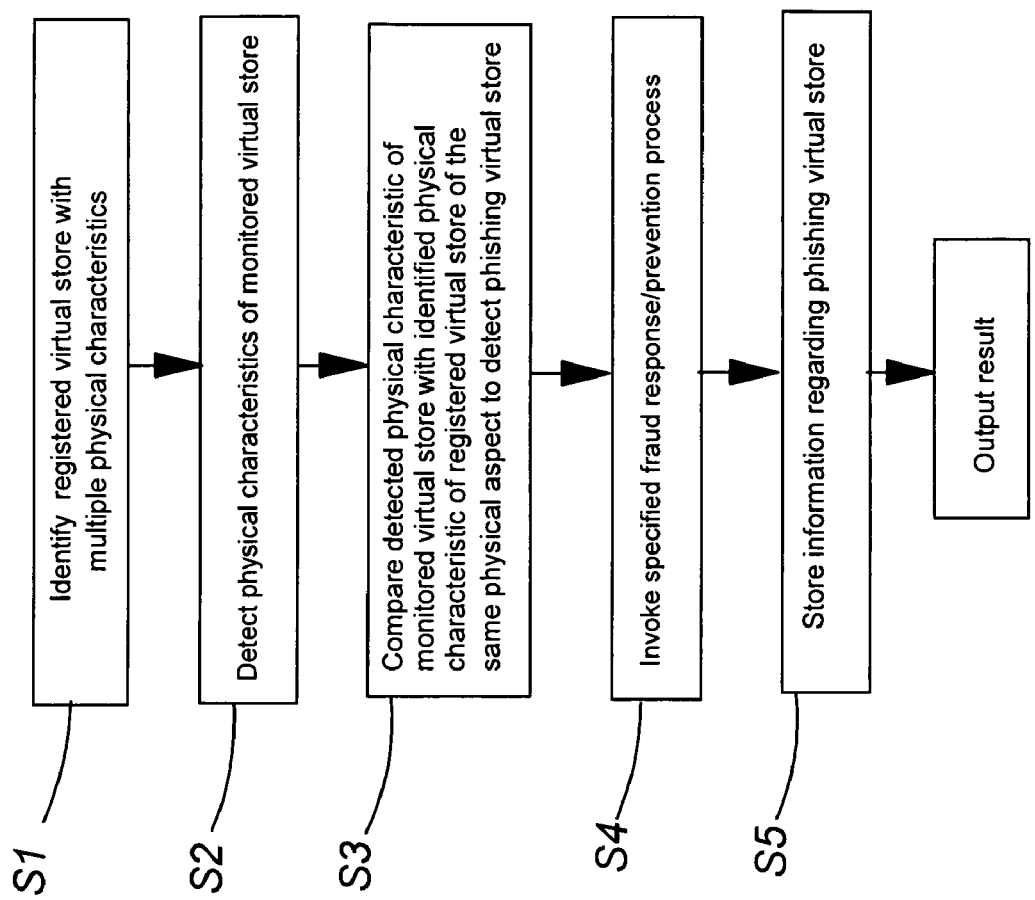
FIG. 2 shows embodiments of an operation of a fraudulence detecting system according to the invention.

An embodiment of the operation of fraudulence detecting system 38 is shown in the flow diagram of FIG. 2. Referring to FIGS. 1-2, collectively, in process S1, registration unit 40 allows a virtual entity 30, e.g., a virtual store, to register with fraudulence detecting system 38 as, e.g., an authentic virtual entity 30R. Upon registration, registration unit 40 may identify the registered virtual store 30R using characteristics of multiple physical aspects of the registered virtual store 30R. The advantages of using multiple physical aspects include providing an enlarged detecting coverage. In the description, multiple virtual stores 30 may include a same or similar physical aspect(s), e.g., exterior appearances, and characteristic of the same physical aspect, e.g., a specific exterior appearance represented by an exterior graphic, of each virtual store 30 can be compared to detect/determine their similarity/difference in the physical aspect. Note that more physical characteristics that are registered/identified, the greater the possibility of detecting a phishing virtual store 30 that emulates the registered virtual store 30 in just a few physical aspects. The identified physical characteristics may include a text including text character retrieved via, e.g., Optical Character Recognition (OCR) techniques, for example a slogan/in-store advertisement displayed in a virtual store 30R; dimensions (interior and/or exterior); location coordinates, e.g., within the virtual universe 24 grid; and/or exterior/interior appearance (i.e., graphics) of virtual store 30R. In addition, other information regarding the registered virtual store 30R, e.g., store name, user 12 (of the virtual store) information such as, but not limited to, identification, IP address, financial information, and/or contact information. The identified physical characteristics may be provided by the registered virtual store 30R, or may be captured/retrieved by characteristic capturing unit 42, or any combination thereof. For example, characteristic capturing unit 42 may capture graphics of multiple views of the exterior and/or the interior of the registered virtual store 30R to identify the registered virtual store 30R. In capturing the graphics to identify the registered virtual store 30R, characteristic capturing unit 42 and/or registration unit 40 may use an entrance of the registered virtual store 30R as a basis for, e.g., arranging the graphics and/or calibrating the graphics. The registration information/identification of a registered virtual store 30R may be stored by storing unit 52.

In process S2, monitoring unit 44 monitors another virtual store 30 (may be either registered virtual store 30R or unregistered virtual store 30U) to detect physical characteristics thereof to determine potential phishing virtual stores 30U. The monitoring may be implemented with certain time and/or space windows/limitations. For example, monitoring unit 44 may monitor another virtual store 30 located within a preset radius of the registered authentic virtual store 30R. Monitoring unit 44 may also monitor a virtual store 30 when a change in a physical aspect occurs to the virtual store 30. Monitoring unit 44 may also monitor an unregistered virtual store 30U that applies for registration to check whether the monitored virtual store 30U is similar to/emulates as an already registered virtual store 30R. Monitoring unit 44 may detect characteristics of another virtual store 30 of the multiple physical aspects that a registered virtual store 30R is identified with. That is, monitoring unit 44 may coordinate with characteristic capturing unit 42 to obtain/detect characteristics of a virtual store 30 of the same physical aspects that a registered virtual store 30 is identified with. Specifically, monitoring unit 44 and characteristic capturing unit 42 may obtain the characteristics of a virtual store 30 in text, dimensions, location coordinates, and/or exterior or interior graphics. Multiple views of graphics may be captured for the exterior and/or interior of the virtual store 30. According to an embodiment, the multiple views together constitute a 360 degree view of the monitored virtual store 30.

In process S3, comparing unit 46 compares the physical characteristics of a monitored virtual store 30 (e.g., an unregistered virtual store 30U) with the identified characteristics of a registered virtual store 30R of a same physical aspect to determine whether the monitored virtual store 30 emulates as the registered virtual store 30R, i.e., whether the monitored virtual store 30 is a phishing virtual store. Usually a phishing virtual store does not need to be 100 percent identical to an authentic virtual store to confuse an avatar 28 visiting the phishing virtual store. To this extent, the comparing may be implemented with a similarity threshold (usually less than 100% similarity). If a physical characteristic of a monitored virtual store 30 is sufficiently similar, i.e., meets the similarity threshold, to the physical characteristic of a registered authentic virtual store 30R of the same physical aspect, the monitored virtual store 30 may be determined as a phishing virtual store. The similarity threshold may be determined based on whether confusion can be caused. For different physical aspects, the thresholds may be different as different aspects require different levels of similarity to cause confusion. Threshold setting unit 48 may set (or receive from an outside source) the similarity threshold for each physical aspect. In addition, the similarity threshold may be calibrated based on empirical data regarding phishing virtual store detection. For example, the similarity threshold may be dynamically updated according to ratings received, such as by applying Bayesian or any other learning algorithm to determine if a threshold needs to be raised or lowered based on false negative and false positive errors, respectively. For example, a threshold may be automatically raised if the current threshold has inaccurately flagged too many virtual stores as potentially fraudulent. For another example, a threshold may be automatically lowered if the current threshold fails to flag sufficient virtual stores that have been reported to be fraudulent. The amount to lower the threshold may be determined by calculating the point at which a previously non-flagged entity may now be flagged with the revised threshold.

According to an embodiment, when comparing physical characteristics of a monitored (second virtual entity) virtual store 30 with a registered (first virtual entity) virtual store 30R, a viewing orientation of an (third virtual entity) avatar 28 visiting each virtual store 30 needs to be considered because the viewing orientation affects whether the visitor avatar 28 can be confused. For different virtual stores 30, the viewing orientation may be different. For example, an entrance of a virtual store 30 may typically be used to determine a viewing orientation of a visitor avatar 28 such that the comparing needs to be based on the entrance of the monitored virtual store 30 and the registered virtual store 30R. For example, an angle of view of a graphics may be determined relative to the entrance, and a front view graphics (i.e., a view directly in front of the entrance) may be assigned extra weight in the comparison. If multiple viewing orientations exist, graphics arranged with the multiple viewing orientations may be compared. This may therefore prevent a fraudulent virtual store owner from, e.g., designing a primary entrance appearance that is substantially original with an alternate entrance appearance that is substantially similar to another virtual store.

In process S4, implementing unit 50 may invoke specified fraud response/prevention process(es) in the case that a monitored virtual store 30 is determined as phishing, i.e., emulating as a registered authentic virtual store 30R. Any response may be implemented. For example, the account of the fraudulent/phishing entity may be suspended, transactions may be limited, rights may be revoked or reduced, etc. Additionally, the phishing virtual store may receive indicia indicative of a suspected phishing, such as a large warning sign over any entrance, or a warning prompt sent to a user's virtual universe client 32 as the user 12 approaches the virtual store.

In process S5, storing unit 52 may store the information regarding a determined phishing virtual store for further references. For example, the UUID of the phishing virtual store may be stored with the user 12 identification (ID), virtual universe account, store name, etc. For example, if a user 12 of the phishing virtual store applies to open a new virtual store 30 in virtual universe 24, the stored information may be retrieved and an alert may be generated by fraudulence detecting system 38 regarding the phishing history/record of the user 12.

The result(s) of the detection/determination may be output to administration center 16 and/or a user of administration center 16.

Figure 3:
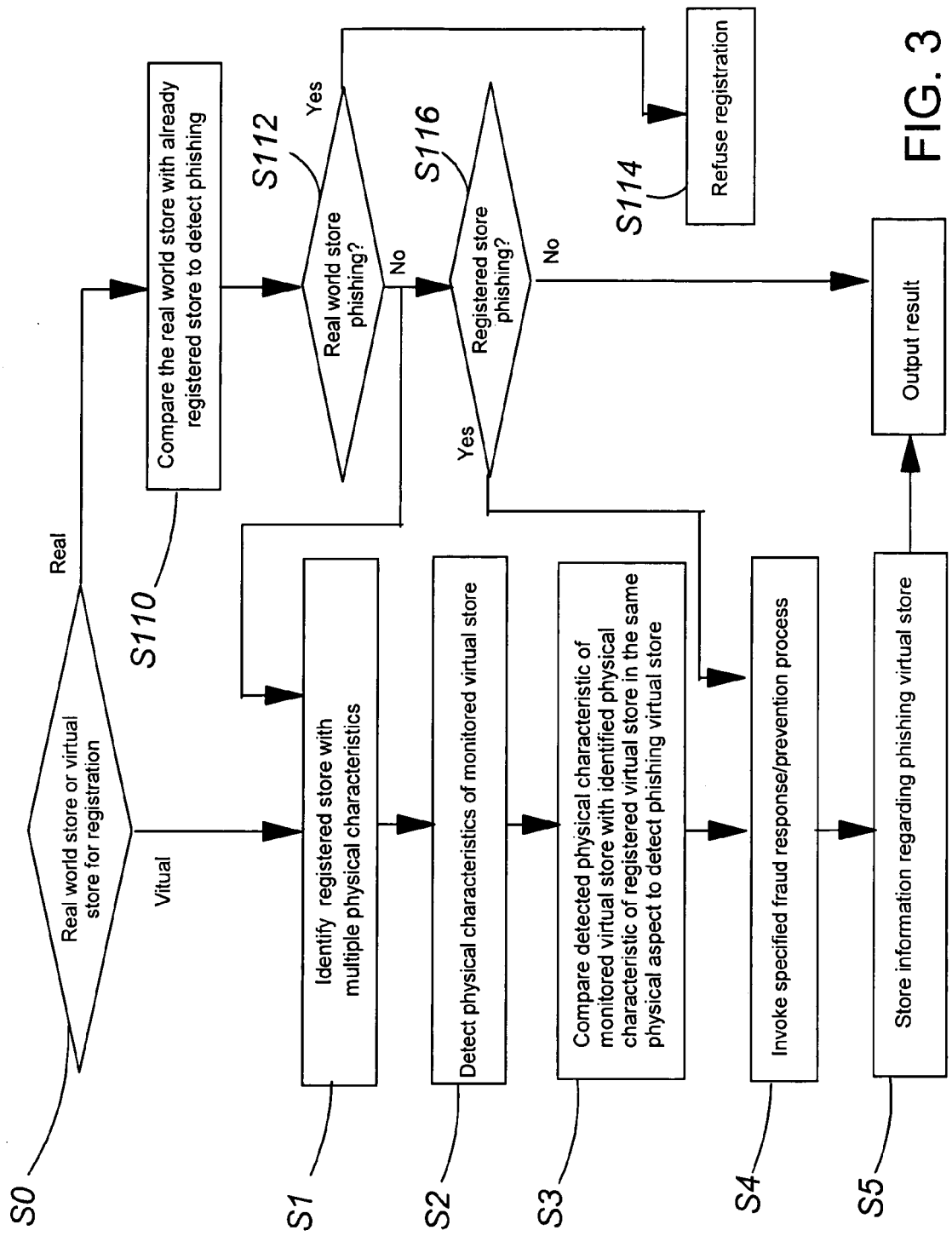
FIG. 3 shows an alternative embodiment of the operation of the fraudulence detecting system according to the invention.

According to an alternative embodiment, as shown in FIG. 3, a real world store may also be registered with fraudulence detecting system 38. In process S100, registration unit 40 may determine whether the store applying for registration is a virtual store 30 or a real world store. If the store is a virtual store 30, i.e., "Virtual", the operation proceeds to process S101, and the subsequent processes S101-S105 may be the same as processes S1-S5 in FIG. 2. If the store is a real world store, i.e., "Real", the operation will proceed to process S110 where the real world store may be compared to an already registered store (virtual store 30 or real world store) to detect phishing. Either the real store applying for registration or the already registered store may be determined as phishing. However, in an embodiment, other conditions being equal, a real world store applying for registration may be given preference over a registered virtual store 30R, as, e.g., the physical characteristics of the real world store are more difficult to maneuver and other solutions exist to detect a fraudulent emulation of a real world store. In process S112, it is determined whether the real world store applying for registration is determined as phishing in process S110. If the real world store is determined as phishing, i.e., "Yes", the registration is refused in process S114. If the real world store is not determined as phishing, the operation proceeds to processes S101 and S116.

In process S116, it is determined whether an already registered store is determined as phishing the real world store applying for registration in process S110. If an already registered store is determined as phishing, i.e., "Yes", the process proceeds to process S104. If "No", the operation proceeds to output the determination result(s).

Figure 4:
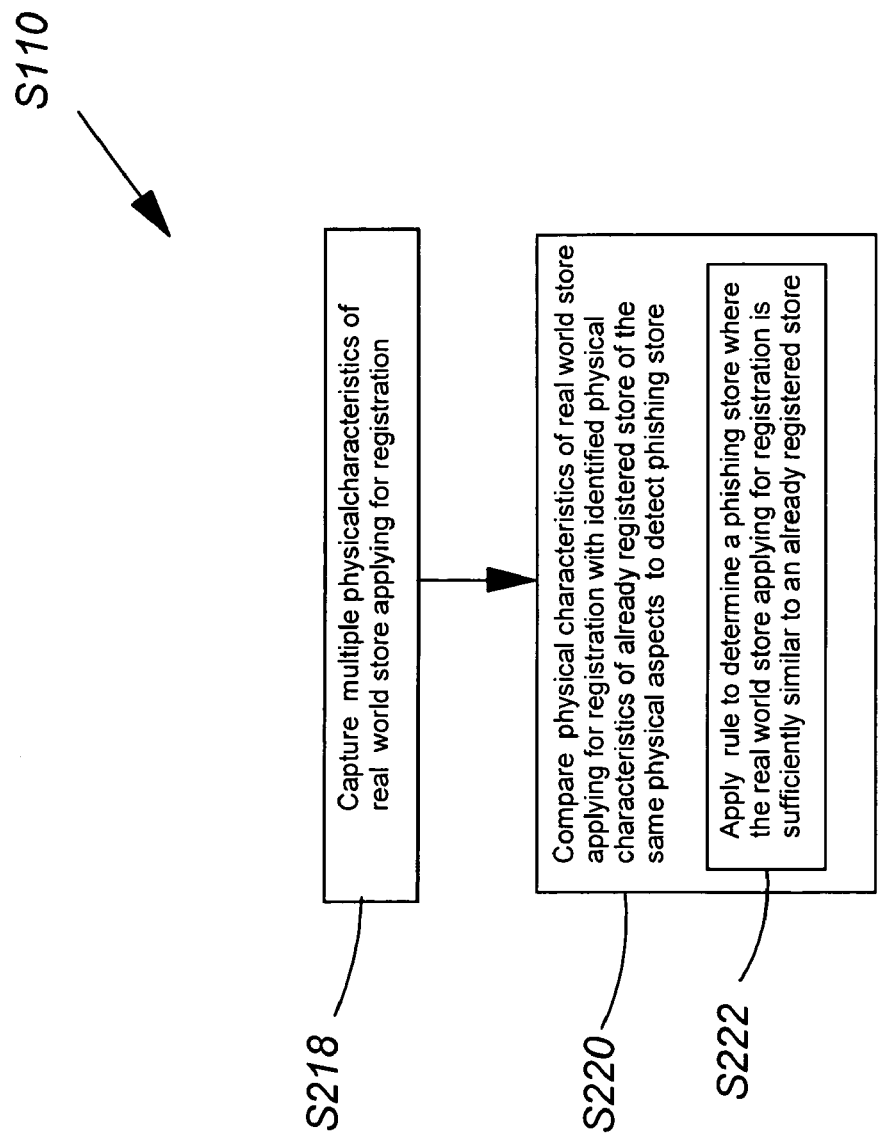
FIG. 4 shows embodiments of the detail of a process of FIG. 3.

FIG. 4 shows the detail of process S110 according to an embodiment. In process S218, characteristic capturing unit 42 obtains physical characteristics of real world store applying registration similar as in process S2 of FIG. 2. The physical characteristics may be provided by the real world store and be certified/approved by characteristic capturing unit 42 or may be actually obtained by characteristic capturing unit 42 independently.

In process S220, comparing unit 46 may compare the physical characteristics of the real world store to the identified physical characteristics of a registered virtual store 30R or an already registered real world store to detect phishing. The comparing may be implemented similarly as in process S3 of FIG. 2. In addition, in sub-process S222, a rule may be retrieved and applied by comparing unit 46 to determine a phishing store in the case the real world store applying for registration is sufficiently similar (i.e., thresholds are met) to an already registered store. For example, a rule may stipulate that when a real world store is sufficiently similar to a registered virtual store 30R, the registered virtual store will be determined as phishing as a preference is given to a real world store.

In the description herein, when a real world entity (e.g., a real world store) applies for registration with fraudulence detecting system 38, the real world entity is treated as a virtual entity no matter whether the real world entity operates virtually in virtual universe 24. To this extent, a "virtual entity" may be a real world entity applying for registration with fraudulence detecting system 38.

3. CONCLUSION

While shown and described herein as a method and system for detecting a phishing virtual entity in a virtual universe, it is understood that the invention further provides various alternative embodiments. For example, in an embodiment, the invention provides a program product stored on a computer-readable medium, which when executed, enables a computer infrastructure to detect a phishing virtual entity in a virtual universe. To this extent, the computer-readable medium includes program code, such as fraudulence detecting system 38 (FIG. 1), which implements the process described herein. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, and/or as a data signal traveling over a network (e.g., during a wired/wireless electronic distribution of the program product).

In another embodiment, the invention provides a method of providing a system for detecting a phishing virtual entity in a virtual universe. In this case, a computer system, such as administration center 16 (FIG. 1), can be generated (e.g., created, deployed, maintained, having made available to, supported etc.) and one or more programs/systems, e.g., fraudulence detecting system 38 (FIG. 1), for performing the process described herein can be obtained (e.g., created, purchased, used, modified, etc.) and deployed to the computer system. To this extent, the deployment can comprise one or more of: (1) installing program code on a computing device, such as administration center 16 (FIG. 1), from a computer-readable medium; (2) adding one or more computing devices to the computer system; and (3) incorporating and/or modifying one or more existing devices of the computer system, to enable the computer system to perform the process described herein.

It should be appreciated that the teachings of the present invention could be offered as a business method on a subscription or fee basis. For example, a fraudulence detecting system 38 (FIG. 1), and a computing device comprising fraudulence detecting system 38 (FIG. 1) could be created, maintained and/or deployed by a service provider that offers the functions described herein for customers. That is, a service provider could offer to provide a service to conduct a marketing activity as described above.

As used herein, it is understood that the terms "program code" and "computer program code" are synonymous and mean any expression, in any language, code or notation, of a set of instructions that cause a computing device having an information processing capability to perform a particular function either directly or after any combination of the following: (a) conversion to another language, code or notation; (b) reproduction in a different material form; and/or (c) decompression. To this extent, program code can be embodied as one or more types of program products, such as an application/software program, component software/a library of functions, an operating system, a basic I/O system/driver for a particular computing and/or I/O device, and the like. Further, it is understood that the terms "component" and "system" are synonymous as used herein and represent any combination of hardware and/or software capable of performing some function(s).

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for detecting a phishing virtual entity in a virtual universe, comprising:
    identifying a first virtual entity using characteristics of multiple physical aspects of the first virtual entity wherein the first virtual entity represents a store within a virtual universe;
    detecting a characteristic of at least one of the multiple physical aspects of a second virtual entity; and
    comparing the characteristic of the second virtual entity with the characteristic of the first virtual entity of a same physical aspect to determine whether one of the first virtual entity or the second virtual entity is a phishing virtual entity that lures visitors into providing personal information.

2. The method of claim 1, wherein the multiple physical aspects include at least one of: a text, a dimension, a location coordinate, or a graphic.

3. The method of claim 2, wherein the identifying includes identifying the first virtual entity using graphics of multiple views of at least one of an exterior or an interior of the first virtual entity.

4. The method of claim 1, wherein the detecting includes obtaining a 360 degree view of at least one of an exterior or an interior of the second virtual entity.

5. The method of claim 1, wherein the comparing is based on a similarity threshold set for the same physical aspect.

6. The method of claim 1, wherein the comparing is based on a viewing orientation of a third virtual entity visiting the first virtual entity and the second virtual entity.

7. The method of claim 6, wherein the viewing orientation is determined based on an entrance of the first virtual entity and an entrance of the second virtual entity.

8. A system for detecting a phishing virtual entity in a virtual universe, comprising:
a computer configured to perform the method comprising:
identifying a first virtual entity using characteristics of multiple physical aspects of the first virtual entity wherein the first virtual entity represents a store within a virtual universe;
detecting a characteristic of at least one of the multiple physical aspects of a second virtual entity; and
comparing the characteristic of the second virtual entity with the characteristic of the first virtual entity of a same physical aspect to determine whether one of the first virtual entity or the second virtual entity is a phishing virtual entity that lures visitors into providing personal information.

9. The system of claim 8, wherein the multiple physical aspects include at least one of: a text, a dimension, a location coordinate, or a graphic.

10. The system of claim 9, wherein the identifying identifies the first virtual entity using graphics of multiple views of at least one of an exterior or an interior of the first virtual entity.

11. The system of claim 8, wherein the detecting obtains a 360 degree view of at least one of an exterior or an interior of the second virtual entity.

12. The system of claim 8, wherein the comparing is based on a similarity threshold set for the same physical aspect.

13. The system of claim 8, wherein the comparing is based on a viewing orientation of a third virtual entity visiting the first virtual entity and the second virtual entity.

14. The system of claim 13, wherein the viewing orientation is determined based on an entrance of the first virtual entity and an entrance of the second virtual entity.

15. A computer program product for detecting a phishing virtual entity in a virtual universe, comprising:
computer usable program code embodied in a non-transitory computer readable medium, which when executed by a computer system enables the computer system to:
identify a first virtual entity using characteristics of multiple physical aspects of the first virtual entity wherein the first virtual entity represents a store within a virtual universe;
detect a characteristic of at least one of the multiple physical aspects of a second virtual entity; and
compare the characteristic of the second virtual entity with the characteristic of the first virtual entity of a same physical aspect to determine whether one of the first virtual entity or the second virtual entity is a phishing virtual entity that lures visitors into providing personal information.

16. The program product of claim 15, wherein the multiple physical aspects include at least one of: a text, a dimension, a location coordinate, or a graphic.

17. The program product of claim 16, wherein the program code is further configured to enable the computer system to identify the first virtual entity using graphics of multiple views of at least one of an exterior or an interior of the first virtual entity.

18. The program product of claim 15, wherein the program code is further configured to enable the computer system to obtain a 360 degree view of at least one of an exterior or an interior of the second virtual entity.

19. The program product of claim 15, wherein the comparing is based on a similarity threshold set for the same physical aspect.

20. The program product of claim 15, wherein the comparing is based on a viewing orientation of a third virtual entity visiting the first virtual entity and the second virtual entity.

21. The program product of claim 20, wherein the viewing orientation is determined based on an entrance of the first virtual entity and an entrance of the second virtual entity.

22. A method for providing a system for detecting a phishing virtual entity in a virtual universe, comprising:
at least one of: creating, maintaining, deploying or supporting a computer infrastructure being operable to:
identify a first virtual entity using characteristics of multiple physical aspects of the first virtual entity wherein the first virtual entity represents a store within a virtual universe;
detect a characteristic of at least one of the multiple physical aspects of a second virtual entity; and
compare the characteristic of the second virtual entity with the characteristic of the first virtual entity of a same physical aspect to determine whether one of the first virtual entity or the second virtual entity is a phishing virtual entity that lures visitors into providing personal information.

23. The method of claim 22, wherein the multiple physical aspects include at least one of: a text, a dimension, a location coordinate, or a graphic.

24. The method of claim 23, wherein the computer infrastructure is further operable to identify the first virtual entity using graphics of multiple views of at least one of an exterior or an interior of the first virtual entity and to obtain a 360 degree view of at least one of an exterior or an interior of the second virtual entity.

25. The method of claim 22, wherein the comparing is based on a viewing orientation of a third virtual entity visiting the first virtual entity and the second virtual entity.

* * * * *